United States Patent Office 3,052,358
Patented Sept. 4, 1962

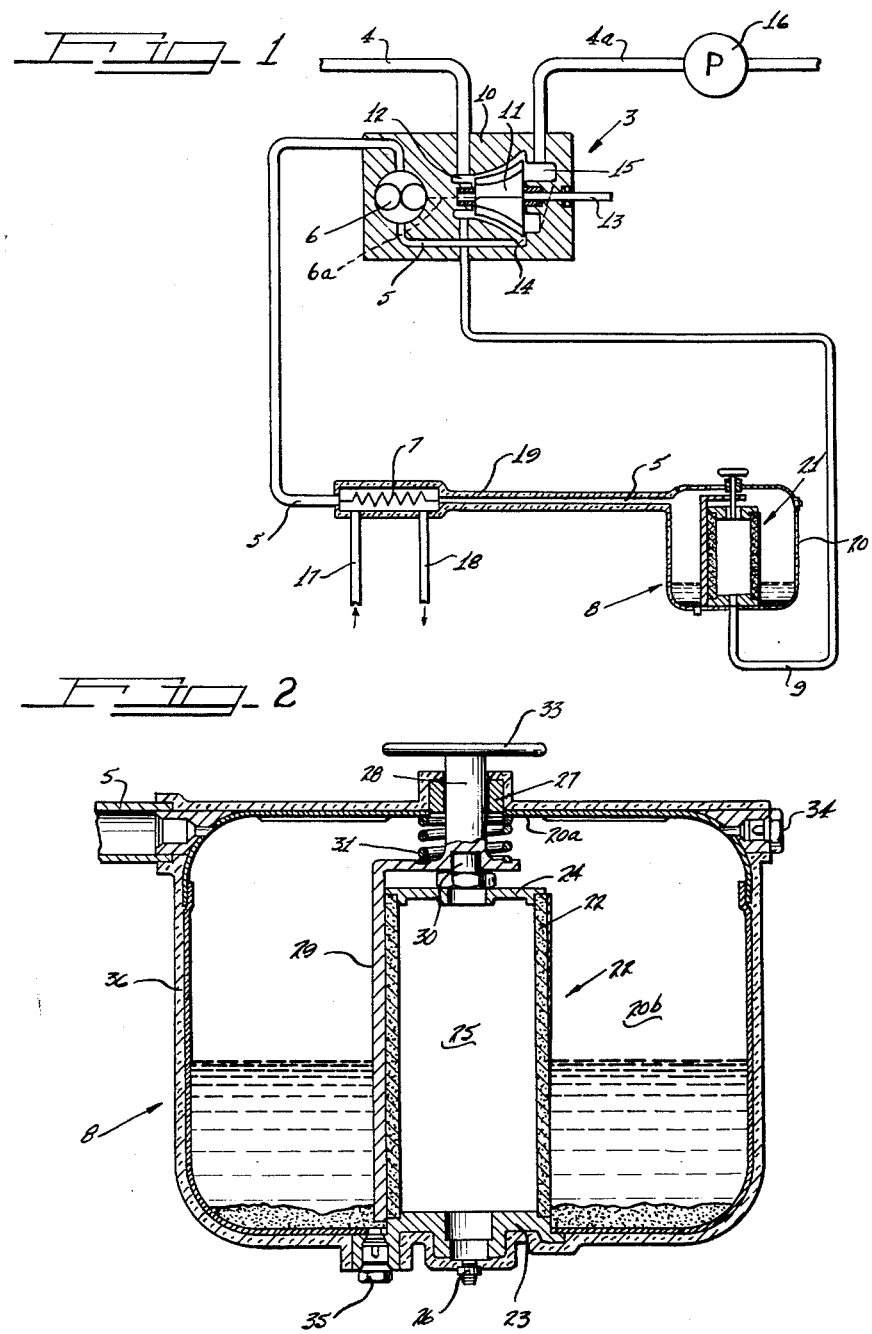

3,052,358
FUEL FILTRATION SYSTEM
William F. Stoermer, Grafton, Ohio, assignor to Thompson Ramo Wooldridge Inc., Cleveland, Ohio, a corporation of Ohio
Filed Aug. 24, 1960, Ser. No. 51,584
2 Claims. (Cl. 210—181)

This invention relates to fuel filtration systems and is more particularly directed to improved means for filtering solid and fluid contaminants or both from a hydrocarbon fuel and the like.

It is a feature of the present invention to provide a filtration system operable over a wide temperature range and adapted for use with liquid fuels containing liquid and solid contaminants.

In the practice of the present invention a solid and/or liquid contaminant containing liquid fuel is centrifugally filtered for separating a contaminant containing fuel portion from the main body of pure fuel and for delivering the contaminant containing portion of the fuel to second barrier or static filtering means whereby the solid and/or liquid contaminants are separated from the fuel and wherein a gear pump is disposed between the first and second filtering means for controlling flow of the contaminant containing fuel portion therebetween.

It is therefore an object of the present invention to provide a liquid fuel filtration system operable over a wide temperature range and adapted for use with liquid fuels containing liquid and solid contaminants.

It is another object of the present invention to provide a liquid fuel filtration system which is capable of filtering either liquid or solid contaminants, or both, from a liquid hydrocarbon fuel.

It is still another object of the present invention to provide a fuel filtration system insensitive to the physical condition of the liquid contaminants in the liquid fuel.

It is a further object of the present invention to provide a fuel filtration system capable of operating with varying quantities of contaminants over a wide range of temperature conditions.

It is still another object of the present invention to provide a non-plugging fuel filtration system operable over a wide temperature range and capable of separating solid and liquid contaminants from a liquid hydrocarbon fuel regardless of the physical condition of the liquid contaminants.

It is another object of the present invention to provide apparatus which is simple and compact in construction and high speed and efficient in operation.

These and other objects, features and advantages of the present invention will become more apparent upon a careful consideration of the following detailed description, when considered in conjunction with the accompanying drawing illustrating a preferred embodiment of the present invention wherein like reference numerals and characters refer to like or corresponding parts throughout the several views.

On the drawings:

FIGURE 1 is a generally schematic view of a fuel filtration system constructed in accordance with the principles of the present invention.

FIGURE 2 is a view in longitudinal section of the barrier or static filtering component of the apparatus of FIG. 1.

As shown on the drawings:

Briefly stated, the present invention, an embodiment of which is shown in FIGURE 1, includes primary centrifugal filter apparatus of the axial flow type, generally indicated by the numeral 3, through which a liquid fuel containing either solid or liquid contaminants, or both, is supplied through an inlet conduit 4. The fuel is filtered in the centrifugal filter apparatus and the fuel separated as a result of centrifugal action into a contaminant containing portion and a contaminant free portion. The contaminant free portion of the fuel is discharged from the end of the centrifugal filter housing 10 opposite the inlet through a conduit 4a from which it flows for subsequent use in the engine with which the filtration system is employed.

The contaminant containing fuel is discharged through a secondary flow conduit 5 and fed at a control rate established by the displacement of a small positive displacement gear pump 6 through a heat exchanger 7 into a secondary filter element of the barrier or static type where the solid and/or liquid contaminants of the fuel are collected. The fuel portion is then discharged through a conduit 9 and returned either to the centrifugal filter element 3 or may be employed as a lubricant for the bearings of the centrifugal filter axial flow impeller or the gear pump 6, which may be directly coupled through shaft 6a to the filter 11 or auxiliary drive means may be employed.

As appears in FIGURE 1, a housing 10 may enclose a chamber sized to receive a conical rotor 11 of the centrifugal axial flow impeller. As fuel contaminated with either solids or liquids, or both, enters the inlet 12 of the rotor from conduit 4, the rotation of the rotor, which has been accelerated to the radial velocity of the rotor drive shaft 13, causes the individual contaminant particles, by centrifugal force, to move in a plurality of spiral trajectories toward the chamber defining wall of the housing 10. As the fuel continues through the rotor chamber, the contaminant particles become concentrated adjacent the chamber wall and are discharged into an annulus 14, while the through flow of filtered fuel is discharged into a passage 15 communicating with the pure fuel outlet 4a and under the influence, if desired, of a conventional pump 16 shown in outline form in FIG. 1.

With the flow of fuel now separated into two streams, a stream of fuel containing no impurities, and a stream containing the impurities, the passage 14 communicates with the contaminant carrying fuel line 5, and contaminant containing fuel is flowed therethrough at a metered or controlled rate established by the displacement of the small positive displacement gear pump 6 of conventional construction.

The gear pump 6 is employed primarily for three major purposes. The gear pump 6 limits and controls secondary flow whereas an orifice or valve would plug with solid contaminants. If one of the contaminants is ice, the gear pump will pulverize the ice as it passes therethrough, and, the gear pump not only controls the flow rate of the contaminant containing fuel portion, but also supplies additional pressure to the secondary filter, if required.

It will be appreciated, of course, that the separation of the solid and liquid contaminants in the centrifugal filter 3, is based on the specific gravity of the individual contaminants. For purposes of illustration hydrocarbon fuels containing the following contaminants were separated in apparatus similar to that set forth in FIG. 1 with a rated rotor speed of 4000 r.p.m.:

|  | Specific gravity |
|---|---|
| Iron oxide | 5.10 |
| Silica sand | 2.10 |
| Linters (cotton-dry) | 1.10 |
| Water | 1.00 |
| Linters (fuel wetted) | 0.93 |
| Ice | 0.92 to 0.88 |
| Fuel | 0.76 to 0.87 |

For purposes of this example it is assumed that the fuel wetted linters have a "relative" specific gravity of less than 1.00.

For purposes of the present example, a hydrocarbon fuel comprising a mixture of kerosene and kerosene derivatives, having a specific gravity within the range set forth in the mixture above, was centrifuged in the primary centrifugal filter 3 and separation occurred whereby the solids and liquid contaminant containing fuel portion was by-passed to the contaminants containing fuel flow line 5.

The gear pump 6 passed all of the solid contaminants and in addition pulverized the ice without any discernible effect thereof on the operation of the gear pump or the fuel filtration system.

Since ice was employed as one of the contaminants, a heat exchanger 7 may be employed. The heat exchanger 7 is of conventional construction and includes an inlet 17 and outlet 18 which may be connected to the engine lubricating oil system as a heat source. Experience has indicated that a flow rate of 0.93 g.p.m. in the flow line 5 will raise the fuel temperature to 33° F. where the inlet fuel temperature to the centrifuge 3 was at −65° F.; the calculations include the latent heat of fusion. Therefore, it is considered desirable to size the gear pump 6 for maintaining a metered flow rate in line 5 of less than 0.93 g.p.m. The heat exchanger 7 is intended for the purpose of only warming the contaminant containing fuel and not for the purpose of melting ice in the heat exchanger. A lubricating oil system employed as a heat source with 300 B.t.u./minute available for de-icing has been employed satisfactorily. It is preferable to insulate both the end of the flow line 5 downstream of the heat exchanger and the heat exchanger with conventional insulation 19 to maintain the contaminant-containing fuel in a heated condition.

Downstream of the heat exchanger the conduit 5 communicates with a secondary filter assembly generally indicated by the numeral 8, which includes a sump housing 20 and a barrier or static type filter of conventional construction, indicated by the numeral 21, which is preferably centrally located in the sump housing 20.

As appears in FIG. 2, the secondary filter element 8 includes the sump housing 20 and barrier filter element 21. The barrier filter element 21 includes a porous cylindrical portion 22 and end caps 23 and 24 defining therebetween a filtered fuel chamber 25. The fuel chamber 25 communicates with the return flow line 9 through a passage in a suitable fitting 26 located in the end plate 23.

The sump housing 20 may be provided with a suitable sleeve flange 27 adapted to receive a shaft 28 carrying a scraper bar 29 for removing the contaminant layer from the barrier filter porous element 22. The shaft 28 may be journaled for rotation on a hub 30 carried by the end plate 24 of the barrier filter. A compression spring 31 may be provided which is bottomed against the scraper bar 29 and the sump housing end wall 20a for maintaining the scraper bar rigid until a handle 33 connected to the scraper bar shaft 28 is lifted against the force of the compression spring to permit rotatable movement of the scraper bar 29 through a 360° circle.

Appropriate purge vent and purge drain fittings 34 and 35 may be provided, as desired.

The entire external surface of the sump housing 20 is provided with insulation 36, as shown.

The porous filter element 22 filters all of the solid particles including linters. Thus, as a contaminant layer of linters builds up on the surface of the porous element, it provides a secondary filtration bed similar in operation to the porous sintered metal element 22. The surface area, therefore, is large relative to the flow rate so that the actual unit flow rate is of the order of "seepage" through the bed depth (for the example above it was indicated that the unit flow rate was less than 4 in./min.). If the pressure drop across the filter 22 increases, the gear pump 6 automatically supplies the additional pressure required for effective filtering and thus eliminates the requirement for additional by-pass valves. The porous element 22 also separates water from the fuel. The water cannot pass through the filter and will collect in the sump chamber 20b. This phenomenon occurs because of the existence of the physical law stating that two immiscible fluids cannot occupy the same area of a wetted surface at the same time; therefore, if the porous element 22 is wetted with fuel, water will not pass through the element 22 into the chamber 25, only fuel will.

When the liquid fuel contains ice crystals and/or supercooled water, the crystals and supercooled water will collect on the filter element 22 and be melted due to the warm fuel in the sump chamber.

The present invention has particular applicability over a wide temperature range and, when the engine, internal combustion or aircraft engine with which the fuel filtration system is employed, is cold prior to starting and the lubricating oil heat is not immediately available for warming of the fuel, the ice particles, if any, will be retained in the sump chamber 20b and will accordingly melt as the oil temperature rises and heats the fuel subsequently entering the sump chamber 20b.

In the event that a quantity of liquid fuel containing an excessive amount of solid or liquid contaminants, such as water and/or ice, enters the fuel system, it will be separated by the primary centrifugal filter 3, ice pulverized in the gear pump, and then stored in the sump where the warm fuel will melt it. Thus means are provided in the present invention to prevent plugging, and the fuel filtration system of the present invention is capable of handling intermittent overloads of contaminants.

The scraper bar 29, which may be manually or automatically actuated to remove the build-up of sludge on the porous filter surface, provides means for continous removal of compacted contaminant from the surface of the porous element 22. The scraped-off contaminant will then settle by gravity to the bottom of the sump chamber 20b where it may be purged when the water is drained through the purge drain 35.

Where the fuel contains water contaminant when the engine is idle and at the low freezing temperatures, the water, of course, will freeze, and the sump must be heated to drain it. However, it will be appreciated that a layer of ice on the bottom of the sump chamber will not impair functioning of the fuel filtration system; the ice will be melted when the engine is started and the heat exchanger heats the contaminant containing fuel as it passes through the heat exchanger.

The fuel collected in the chamber 25 then passes through the conduit in the fitting 26 and through return line 9 which may be connected either to the inlet of the chamber 12 for mixture with the contaminant containing fuel entering through the inlet 4 or may be supplied through conduit 9 to lubricate the bearings of the rotor and gear pump 6 and then communicated with the inlet conduit 4.

It will thus be appreciated that by employment of the present invention a liquid fuel filtration system is provided which is capable of handling only solid contaminants, handling both solid and liquid contaminants, the filtration reliability of which is insensitive to the physical condition of the liquid contaminants, which is capable of intermittently handling excessive quantities of contaminant, which is non-plugging, and which is capable of operating over a wide temperature range, including temperatures below 32° F.

Although various modifications might be suggested by those versed in the art, it should be understood that I wish to embody within the scope of the patent warranted hereon all such embodiments as reasonably and properly come within the scope of my contribution to the art.

I claim as my invention:

1. A filtration system operable over a wide temperature range including temperatures below 32° F. and adapted for use with liquid fuels containing liquid and solid contaminants comprising a positive displacement gear pump and centrifugal filter unit, means for driving the pump and centrifugal filter of said unit including a common driving shaft, said centrifugal filter being effective for separating a contaminant containing portion of the fuel from the remainder thereof, a fuel wettable barrier filter receiving the contaminant containing portion of the fuel from the centrifugal filter and filtering the contaminants including water from the fuel, said pump continuously removing the contaminant containing fuel portion from the centrifugal filter and controlling the flow rate thereof to said barrier filter, conduit means connecting the pump and filter unit with the barrier filter, and a heat exchanger in said conduit means downstream from the pump and upstream from the barrier filter for controlling the temperature of the contaminant containing fuel portion.

2. A fuel filtration system operable over a wide temperature range including temperatures below 32° F. and adapted for use with liquid hydrocarbon fuels containing liquid and solid contaminants which comprises a gear pump and centrifugal filter unit, means for driving the gear pump and centrifugal filter of said unit including a common driving shaft, said centrifugal filter being effective for separating a contaminant containing portion of the fuel from the remainder thereof, hydrocarbon fuel wettable barrier filter means receiving the contaminant containing portion of the fuel from the centrifugal filter and filtering the contaminants including water from the fuel, said gear pump continuously removing the contaminant containing fuel portion from the centrifugal filter, controlling the flow rate of said contaminant containing fuel portion to said barrier filter and pulverizing any ice crystals that may be present in the contaminant containing fuel portion, conduit means connecting the gear pump and filter unit with the barrier filter means, a heat exchanger in said conduit means receiving the contaminant containing fuel portion from the gear pump and controlling the temperature of said fuel portion, and second conduit means delivering filtered fuel from the barrier filter means back to the centrifugal filter.

References Cited in the file of this patent
UNITED STATES PATENTS
2,720,313    Pattison _____ Oct. 11, 1955